United States Patent
Takeda

(10) Patent No.: US 12,535,110 B2
(45) Date of Patent: Jan. 27, 2026

(54) BRAKE FOR MOTOR

(71) Applicant: HARMONIC DRIVE SYSTEMS INC., Tokyo (JP)

(72) Inventor: Toru Takeda, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 408 days.

(21) Appl. No.: 18/264,852

(22) PCT Filed: Apr. 28, 2021

(86) PCT No.: PCT/JP2021/017046
§ 371 (c)(1),
(2) Date: Aug. 9, 2023

(87) PCT Pub. No.: WO2022/230131
PCT Pub. Date: Nov. 3, 2022

(65) Prior Publication Data
US 2024/0102522 A1    Mar. 28, 2024

(51) Int. Cl.
*F16D 63/00* (2006.01)
*F16D 65/18* (2006.01)
(Continued)

(52) U.S. Cl.
CPC ........... *F16D 63/006* (2013.01); *F16D 65/18* (2013.01); *H02K 49/046* (2013.01); *F16D 2121/20* (2013.01)

(58) Field of Classification Search
CPC ........ F16D 63/006; F16D 65/16; F16D 65/18; F16D 2121/20; F16D 63/002; F16D 55/08; H02K 49/046; H02K 7/1023; H02K 7/10
See application file for complete search history.

(56) References Cited

U.S. PATENT DOCUMENTS 10,300,397 B2 * 5/2019 Diehl ................. A62B 35/0093
10,502,277 B2 * 12/2019 Masuda ................ B60T 13/741
(Continued)

FOREIGN PATENT DOCUMENTS

| JP | 2005069391 A | 3/2005 |
| JP | 2013056573 A | 3/2013 |
| JP | 2021008912 A | 1/2021 |

OTHER PUBLICATIONS

Japanese Patent JP 2020-29937 published on Feb. 27, 2020.*
(Continued)

*Primary Examiner* — Pamela Rodriguez
(74) *Attorney, Agent, or Firm* — BUCHANAN INGERSOLL & ROONEY PC

(57) ABSTRACT

A brake for a motor includes a fixed-side engaging plate fixed to a motor shaft; a movable-side engaging plate coaxially opposed to the fixed-side engaging plate along the direction of a center axis; and a self-holding type solenoid that moves, in the direction of the center axis, the movable-side engaging plate to a halt cancelation position separated from the fixed-side engaging plate and a halt position where engagement with the fixed-side engaging plate occurs. When the motor is halted, the solenoid is driven to move the movable-side engaging plate from the halt cancelation position to the halt position. The movable-side engaging plate which has reached the halt position is mechanically engaged with the fixed-side engaging plate, and the motor shaft is forcibly halted.

2 Claims, 4 Drawing Sheets

(51) Int. Cl.
*F16D 121/20* (2012.01)
*H02K 49/04* (2006.01)

(56) References Cited

U.S. PATENT DOCUMENTS

| | | |
|---|---|---|
| 11,545,872 B2 | 1/2023 | Ichiki et al. |
| 2003/0184177 A1* | 10/2003 | Enzinna ................ H02K 7/125 |
| | | 310/93 |

OTHER PUBLICATIONS

International Search Report (PCT/ISA/210) with translation and Written Opinion (PCT/ISA/237) mailed on Jun. 29, 2021, by the Japan Patent Office as the International Searching Authority for International Application No. PCT/JP2021/017046. (9 pages).

* cited by examiner

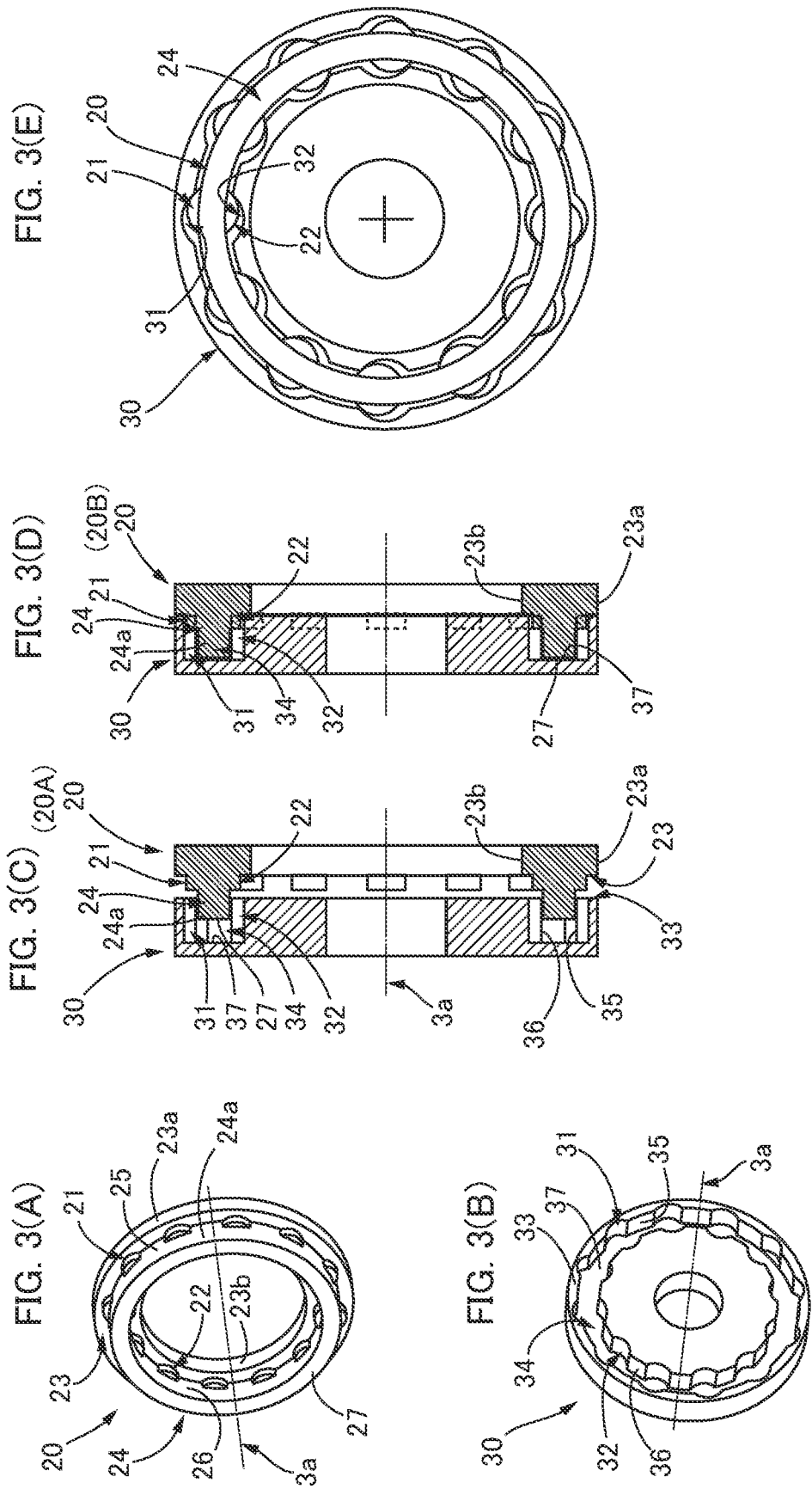

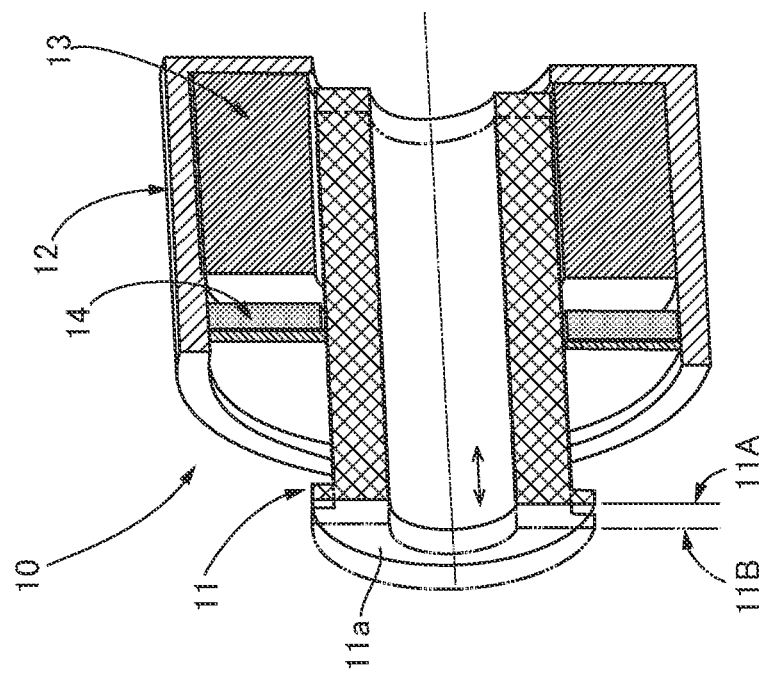

BRAKE FOR MOTOR

TECHNICAL FIELD

The present invention relates to a brake for a motor for halting a motor shaft in an emergency, etc.

BACKGROUND ART

For motor brakes for industrial use, non-excitation actuated type electromagnetic brakes are commonly used. When the brake is in the released state, the electromagnetic brake is energized, and a friction plate is attracted in the axial direction. In an emergency, energization to the electromagnetic brake is stopped, and by means of spring force, the motor is halted using friction from the friction plate. A non-excitation actuated type electromagnetic brake is disclosed in, for example, Patent Document 1.

One known example of a solenoid is a self-holding type solenoid combining an open frame solenoid with a permanent magnet. Due to instantaneous energization of a coil, a plunger is attracted, and after having been attracted, the plunger is attached to and held by the permanent magnet. Energization is not required while the plunger is held in the attracted position, which proves effective when longer battery life is desired and when less heat generation is desired. For example, Patent Document 2 discloses an in-wheel motor using a self-holding type solenoid as a parking brake.

PRIOR ART DOCUMENTS

Patent Documents

Patent Document 1: JP 2005-69391 A
Patent Document 2: JP 2013-56573 A

SUMMARY OF THE INVENTION

Problems to be Solved by the Invention

With a non-excitation type brake for a motor, when the motor is operating, energizing a coil causes a frictional plate to slip in a state of being magnetically attracted to the coil, in opposition to spring force. Due to wear occurring while the frictional plate is slipping, wear debris is generated from the friction plate. The wear debris is dispersed onto, inter alia, an encoder disk installed near the brake for a motor, leading to faults occurring with encoder disk reading. Moreover, oily matter such as grease mist can adhere to the friction plate. Oil does not volatilize and remains on the friction plate; therefore, when the brake is actuated, slipping occurs on the friction plate, and a phenomenon occurs in which the motor cannot be halted during an emergency stop. Furthermore, brake-halting characteristics depend on the friction coefficient of the friction plate and on the spring characteristics. Ordinarily, to generate braking force greater than or equal to the motor-rated torque, it is necessary to design the brake according to the characteristics of each motor on an individual basis.

With the foregoing in view, it is an object of the present invention to provide a brake for a motor that is capable of performing emergency halting of the motor without using a friction plate, and that consumes minimal electrical power.

Means of Solving the Problems

In order to overcome the problems above, the brake for a motor of the present invention is characterized in being provided with:

a fixed-side engaging plate attached to a motor shaft so as to rotate integrally with the motor shaft and not move in the direction of the center axis;

a movable-side engaging plate coaxially facing the fixed-side engaging plate in the direction of the center axis, capable of moving in the direction of the center axis, and incapable of rotating around the center axis; and a solenoid for moving the movable-side engaging plate in the direction of the center axis to a halt cancelation position where the movable-side engaging plate is set apart from the fixed-side engaging plate and to a halt position where the movable-side engaging plate is engaged with the fixed-side engaging plate, wherein one of the movable-side engaging plate and the fixed-side engaging plate is provided with radially protruding engagement protrusions formed at an equiangular interval along the circumference of a circle centered on the center axis; and the other of the movable-side engaging plate and the fixed-side engaging plate is provided with radially receding engagement recesses formed at positions facing each of the engagement protrusions in the direction of the center axis, and the recess ends of the engagement recesses toward the engagement protrusions are opened so that the engagement protrusions can be inserted in the direction of the center axis; and wherein the engagement protrusions disengage from the engagement recesses in the halt cancelation position of the movable-side engaging plate, and the fixed-side engaging plate and the movable-side engaging plate are capable of rotating relative to each other; and the engagement protrusions insert into the engagement recesses in the halt position of the movable-side engaging plate, and the fixed-side engaging plate and the movable-side engaging plate are in an engaged state in which relative rotation therebetween is impossible.

When the motor is in a normal state of operation, the movable-side engaging plate is positioned at the halt cancelation position, set apart in the direction of the center axis from the fixed-side engaging plate attached to the motor shaft. When halting the motor, the solenoid is driven and the movable-side engaging plate is moved from the halt cancelation position to the halt position. Upon reaching the halt position, the movable-side engaging plate mechanically engages with the fixed-side engaging plate, resulting in a state in which relative rotation therebetween is impossible. In other words, each of the engagement protrusions is forcibly inserted in the direction of the center axis into the corresponding engagement recess, and a state of mechanical engagement is formed therebetween. The movable-side engaging plate is a member held in a rotation-disabled state; therefore, when the movable-side engaging plate engages with the fixed-side engaging plate on the motor shaft side, the motor shaft forcibly halts. When the solenoid is driven and the movable-side engaging plate returns from the halt position to the halt cancelation position, the state of mechanical engagement between the fixed-side engaging plate and movable-side engaging plate is released, and the motor shaft, to which the fixed-side engaging plate is attached, returns to a rotation-enabled state.

It is possible to eliminate any adverse effects caused by wear debris generated when the motor shaft is forcibly halted using the friction of the friction plate and any adverse effects caused by slipping of the friction plate. Moreover, causing the motor shaft to be halted via mechanical engagement facilitates brake design to a greater extent than when the friction coefficient of the friction plate, the spring force, etc., are set so as to be suited to individual motors, as with a brake for a motor using a friction plate.

In the brake for a motor of the present invention, a self-holding type solenoid can be used as the solenoid. By using a self-holding type solenoid, energization is only necessary when moving the movable-side engaging plate, there being no need for energization to hold the movable-side engaging plate in the halt cancelation position or in the halt position. It is thereby possible to provide a brake for a motor that consumes minimal electrical power.

BRIEF DESCRIPTION OF THE DRAWINGS

FIG. 3(A) is an illustrative view of a plunger-side engaging disk, which is a movable-side engaging plate, FIG. 3(B) is an illustrative view of a motor-shaft side engaging disk, which is a fixed-side engaging plate, FIG. 3(C) is a vertical sectional view of the disks in a disengaged state when the motor is operating, FIG. 3(D) is a vertical sectional view of the disks in an engaged state when the motor is halted, and FIG. 3(E) is an illustrative view of the disks in an engaged state when the motor is halted; and FIG. 4 is a general sectional oblique view of the structure of a self-holding type solenoid of a brake for a motor.

MODE FOR CARRYING OUT THE INVENTION

An embodiment of a brake for a motor in which the present invention has been applied is described below with reference to the accompanying drawings. The embodiment below shows one example of the present invention, there being no intention for the present invention to be limited to the present embodiment.

Figure 1:
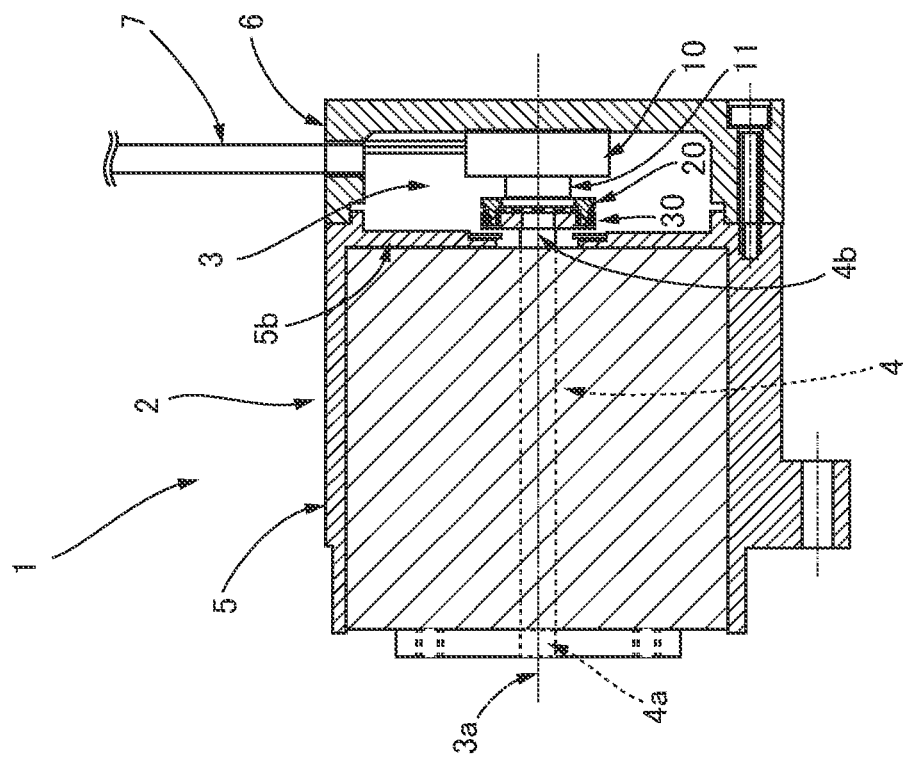
FIG. 1 is a general structural view of a motor system incorporating a brake for a motor of the present invention.

FIG. 1 is a general structural view of an electric motor according to the embodiment. The electric motor 1 is provided with a motor body 2 and a brake 3 for a motor attached to a proximal end of the motor body 2. The motor body 2 is a common electric motor; therefore, the internal structure is not illustrated. The motor body 2 has a motor shaft 4, a shaft end 4a on a distal-end side of which is exposed forward of the front end of a cylindrical motor case 5, where a member (not illustrated) on the load side is connected. A shaft end 4b on the proximal end of the motor shaft 4 passes through an end plate portion 5b on the proximal side of the motor case 5 and protrudes rearward. A cup-shaped cover 6 of the brake 3 for a motor is fastened securely to the proximal side of the motor case 5. Inside the cover 6, the brake 3 for a motor is attached to the shaft end 4b of the motor shaft 4. A wiring cable 7 is led from the brake 3 for a motor to the exterior of the electric motor 1.

Figure 2A:
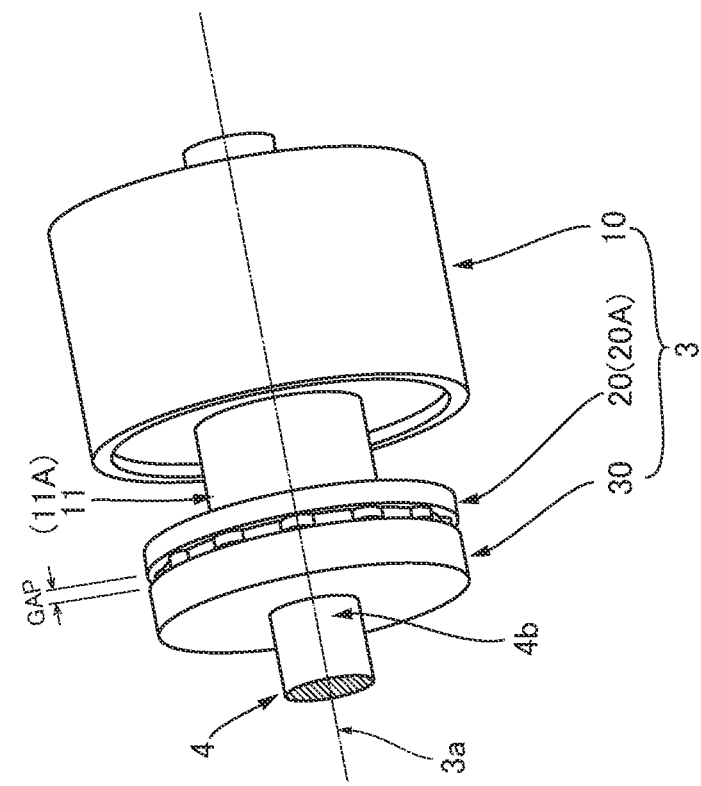
FIG. 2(A) is an illustrative view of the brake for a motor in FIG. 1 when the motor is operating.
Figure 2B:
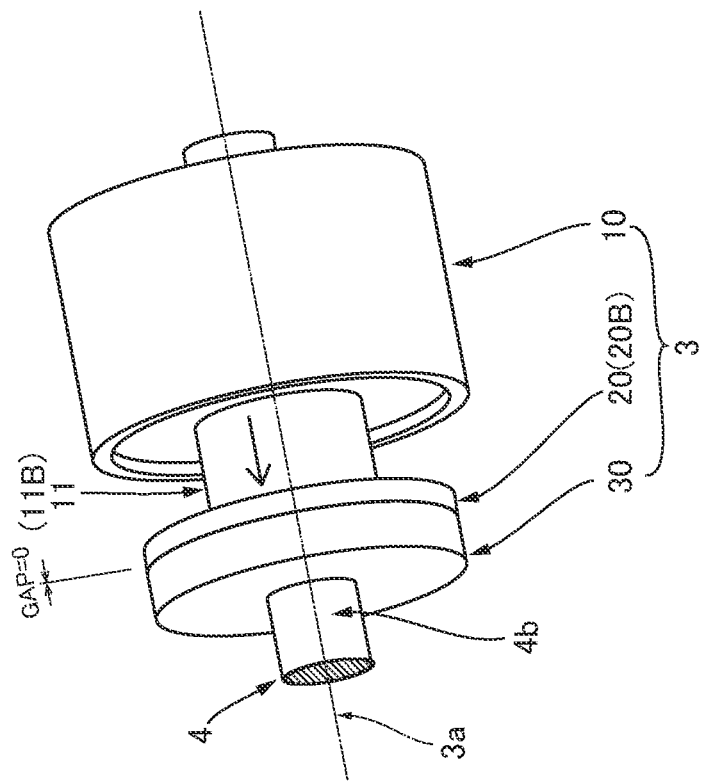
FIG. 2(B) is an illustrative view of the same when the motor is halted.

FIG. 2(A) is an illustrative view of the brake 3 for a motor when the motor is operating, and FIG. 2(B) is an illustrative view of the same when the motor is halted. The brake 3 for a motor is provided with a solenoid 10, a movable-side engaging plate 20 attached to a distal-end portion of a plunger 11 on the solenoid 10, and a fixed-side engaging plate 30 attached to a shaft end 4b of the motor shaft 4.

The fixed-side engaging plate 30 assumes the form of a disk having a prescribed thickness and is coaxially affixed to the motor shaft 4 so as to rotate integrally with the motor shaft 4 and not move in the direction of the center axis 3a. The movable-side engaging plate 20 also assumes the form of a disk and is securely and coaxially connected to a distal-end portion of the plunger 11 on the solenoid 10 so as to coaxially face the fixed-side engaging plate 30 in the direction of the center axis 3a.

When the solenoid 10 is energized, the plunger 11 moves linearly in the direction of the center axis 3a along a given stroke (e.g., 2 to 3 mm). When the plunger 11 is in the retracted position 11A shown in FIG. 2(A), the movable-side engaging plate 20 affixed to a distal-end portion of the plunger 11 is in the halt cancelation position 20A, which is set apart from the fixed-side engaging plate 30 by a given gap in the direction of the center axis 3a. When the plunger 11 is in the protruding position 11B shown in FIG. 2(B), the movable-side engaging plate 20 affixed to a distal-end portion of the plunger 11 is in the halt position 20B, where the movable-side engaging plate 20 is mechanically engaged with the fixed-side engaging plate 30. When the movable-side engaging plate 20 is positioned in the halt position 20B, the fixed-side engaging plate 30 assumes a rotation-disabled state, and the rotation of the motor shaft 4, which is securely connected to the fixed-side engaging plate 30, halts.

FIG. 3(A) is an illustrative view of a movable-side engaging plate, FIG. 3(B) is an illustrative view of a fixed-side engaging plate, FIG. 3(C) is a vertical sectional view of the disks in a disengaged state when the motor is operating, FIG. 3(D) is a vertical sectional view of the disks in an engaged state when the motor is halted, and FIG. 3(E) is an illustrative view of the disks in an engaged state when the motor is halted. The structure and engaged state of the movable-side engaging plate 20 and fixed-side engaging plate 30 shall now be described with reference to these drawings.

A plurality of outer peripheral engagement protrusions 21 and a plurality of inner peripheral engagement protrusions 22 are formed on the movable-side engaging plate 20. The outer peripheral engagement protrusions 21 are arranged at equiangular intervals along the circumference of a circle centered on the center axis 3a and are arcuate protrusions of a given thickness, protruding radially outward. The inner peripheral engagement protrusions 22 are also arranged at equiangular intervals along the circumference of a circle centered on the center axis 3a and are arcuate protrusions of a given thickness, protruding radially inward.

A plurality of outer peripheral engagement recesses 31 and a plurality of inner peripheral engagement recesses 32 are formed in the fixed-side engaging plate 30. Each of the outer peripheral engagement recesses 31 is positioned to face the corresponding outer peripheral engagement protrusion 21 in the direction of the center axis 3a. The outer peripheral engagement recesses 31 are arcuate recesses that have a given depth, recede radially outward, and have a shape that is complementary to the outer peripheral engagement protrusions 21. The recess ends of the outer peripheral engagement recesses 31 toward the outer peripheral engagement protrusions 21 open so that the outer peripheral engagement protrusions 21 can be inserted in the direction of the center axis 3a.

Similarly, each of the inner peripheral engagement recesses 32 is positioned to face the corresponding inner peripheral engagement protrusion 22 in the direction of the center axis 3a. The inner peripheral engagement recesses 32 are arcuate recesses that have a given depth, recede radially inward, and have a shape that is complementary to the inner peripheral engagement protrusions 22. The recess ends of the inner peripheral engagement recesses 32 toward the inner peripheral engagement protrusions 22 open so that the inner peripheral engagement protrusions 22 can be inserted in the direction of the center axis 3a.

More specifically, an annular movable-side end face 23 facing the fixed-side engaging plate 30 is formed on the movable-side engaging plate 20. An annular protrusion 24 is formed coaxially on the movable-side end face 23. The annular protrusion 24 protrudes from the movable-side end face 23 in the direction of the center axis 3a, a given thickness, and by a given amount. A circular outer peripheral surface of the annular protrusion 24 is smaller than a circular outer peripheral surface 23a of the movable-side end face 23, and a circular inner peripheral surface 26 of the annular protrusion 24 is larger than a circular inner peripheral surface 23b of the movable-side end face 23. Outer peripheral engagement protrusions 21 are formed at a first angular interval along the circumferential direction on the circular outer peripheral surface 25 of the annular protrusion 24. Inner peripheral engagement protrusions 22 are formed at a second angular interval along the circumferential direction on the circular inner peripheral surface 26. A portion of the annular protrusion 24 of the movable-side engaging plate 20 on the distal-end side in the direction of the center axis is an annular distal-end portion 24a protruding on the side of the fixed-side engaging plate 30 to a greater extent than the outer peripheral engagement protrusions 21 and inner peripheral engagement protrusions 22.

A circular fixed-side end face 33 facing the movable-side end face 23 of the movable-side engaging plate 20 is formed on the fixed-side engaging plate 30. An annular groove 34 of a given width and given depth is formed coaxially on the fixed-side end face 33. The annular protrusion 24 of the movable-side engaging plate 20 can be inserted into the annular groove 34 in the direction of the center axis 3a. In the annular groove 34, outer peripheral engagement recesses 31 are formed in a circular inner peripheral surface 35 of the annular groove 34, the circular inner peripheral surface 35 being a groove-side surface on an outer peripheral side of the annular groove, and the outer peripheral engagement recesses 31 being formed at a first angular interval along the circumferential direction. Inner peripheral engagement recesses 32 are formed in a circular outer peripheral surface 36 of the annular groove 34, the circular outer peripheral surface 36 being a groove-side surface on an inner peripheral side of the annular groove 34, and the inner peripheral engagement recesses 32 being formed at a second angular interval along the circumferential direction.

The groove depth of the annular groove 34 (the groove depth in the direction of the center axis 3a) is the same as the amount by which the annular protrusion 24 of the movable-side engaging plate 20 protrudes (the amount of protrusion in the direction of the center axis 3a). When the annular protrusion is inserted into the annular groove 34, an annular distal-end surface 27 of the annular protrusion 24 contacts a base surface 37 of the groove in the direction of the center axis 3a, and the fixed-side end face 33 assumes a state of contact with the movable-side end face 23.

As shown in FIG. 3(C), when the movable-side engaging plate 20 is in the halt cancelation position 20A, only the annular distal-end portion 24a of the annular protrusion 24 of the movable-side engaging plate 20 is inserted in the annular groove 34 of the fixed-side engaging plate 30, in a state in which there is clearance between the annular distal-end portion 24a and the fixed-side engaging plate 30. In this state, the outer peripheral engagement protrusions 21 and inner peripheral engagement protrusions 22 are both disengaged from the outer peripheral engagement recesses 31 and inner peripheral engagement recesses 32 of the fixed-side engaging plate 30. Therefore, the fixed-side engaging plate 30 and the movable-side engaging plate 20 can rotate relative to each other, and the motor shaft 4 can rotate.

As shown in FIGS. 3(D) and (E), when the movable-side engaging plate 20 is in the halt position 20B, the outer peripheral engagement protrusions 21 and inner peripheral engagement protrusions 22 are respectively inserted into the outer peripheral engagement recesses 31 and inner peripheral engagement recesses 32, and the fixed-side engaging plate 30 and the movable-side engaging plate 20 are in an engaged state in which relative rotation therebetween is impossible. The movable-side engaging plate 20 is held so as to be incapable of rotating around the center axis; therefore, with the movable-side engaging plate 20 being engaged with the fixed-side engaging plate 30, which is affixed to the motor shaft 4, rotation-halting force is applied to the motor shaft 4, and the motor shaft 4 is placed in a rotation-halted state.

The solenoid 10, which moves the movable-side engaging plate 20 to a halt cancelation position 20A or a halt position 20B, shall be described next, with reference to FIG. 4.

The solenoid 10 is a self-holding type solenoid. The solenoid 10 is provided with a cylindrical frame 12. A hollow plunger 11 is disposed so as to pass through the center of the frame 12. The plunger 11 is supported by the frame 12 so as to be capable of moving in the direction of the center axis 3a but incapable of rotating. Inside the frame 12, a magnetic circuit is configured enclosing the plunger 11, the magnetic circuit including a coil 13 for generating electromagnetic force to move the plunger 11 to a retracted position 11A or a protruding position 11B in the direction of the center axis 3a. Moreover, inside the frame 12, a permanent magnet 14 is disposed enclosing the plunger 11, for the purpose of generating attractive force to hold the plunger 11 in either position to which the plunger 11 has moved, i.e., the retracted position or the protruding position.

A movable-side engaging plate 20 is coaxially affixed to a distal-end portion 11a of the plunger 11. When the plunger 11 is in the retracted position 11A, the movable-side engaging plate 20 is positioned in the halt cancelation position 20A. When the plunger 11 moves to the protruding position 11B, the movable-side engaging plate 20 is positioned in the halt position 20B.

The invention claimed is:
1. A brake for a motor comprising:
a fixed-side engaging plate attached to a motor shaft subject to control, so as to rotate integrally with the motor shaft and not move in a direction of a center axis;
a movable-side engaging plate coaxially facing the fixed-side engaging plate in the on of the center axis; and
a solenoid for moving the movable-side engaging plate along the direction of the center axis to a halt cancelation position where the movable-side engaging plate is set apart from the fixed-side engaging plate and to a halt position where the movable-side engaging plate is engaged with the fixed-side engaging plate,
wherein
the movable-side engaging plate comprises:
a movable-side end face facing the fixed-side engaging plate;
an annular protrusion protruding from the movable-side end face in the direction of the center axis;
outer peripheral engagement protrusions protruding arcuately and radially outward, formed at a first angular interval along a circular outer peripheral surface of the annular protrusion; and inner peripheral engagement protrusions protruding arcuately and radially inward, formed at a second angular interval along a circular inner peripheral surface of the annular protrusion, wherein the fixed-side engaging plate comprises:

a fixed-side end face facing the movable-side end face;

an annular groove into which the annular protrusion can be inserted in the direction of the center axis, the annular groove being formed on the fixed-side end face;

outer peripheral engagement recesses formed in a circular inner peripheral surface of the annular groove, the circular inner peripheral surface being a groove-side surface on an outer peripheral side of the annular groove, and the outer peripheral engagement recesses being formed at the first angular interval along the circular inner peripheral surface; and inner peripheral engagement recesses formed in a circular outer peripheral surface of the annular groove, the circular outer peripheral surface being a groove-side surface on an inner peripheral side of the annular groove, and the inner peripheral engagement recesses being formed at the second angular interval along the circular outer peripheral surface, wherein recess ends of the outer peripheral engagement recesses toward the outer peripheral engagement protrusions are opened so that the outer peripheral engagement protrusions can be inserted in the direction of the center axis; and recess ends of the inner peripheral engagement recesses toward the inner peripheral engagement protrusions are opened so that the inner peripheral engagement protrusions can be inserted in the direction of the center axis; and the annular protrusion of the movable-side engaging plate is provided with an annular distal-end portion protruding on a side of the fixed-side engaging plate to a greater extent than the outer peripheral engagement protrusions and the inner peripheral engagement protrusions, and wherein when the movable-side engaging plate is in the halt cancelation position, only the annular distal-end portion of the annular protrusion is inserted in the annular groove of the fixed-side engaging plate; the outer pheripheral engagement protrusions and the inner peripheral engagement protrusions disengage from the outer peripheral engagement recesses and the inner peripheral engagement recesses, respectively, and the fixed-side engaging plate and the movable-side engaging plate are capable of rotating relative to each other; and when the movable-side engaging plate is in the halt position, the outer peripheral engagement protrusions and the inner peripheral engagement protrusions are respectively inserted in the outer peripheral engagement recesses and the inner peripheral engagement recesses, and the fixed-side engaging plate and the movable-side engaging plate are in an engaged state in which relative rotation therebetween is impossible.

2. The brake for a motor according to claim 1, wherein the solenoid is a self-holding type solenoid and comprises:

a frame;

a plunger supported by the frame so as to be capable of moving in an axial direction;

a magnetic circuit including a coil for generating electromagnetic force to move the plunger to a retracted position and to a protruding position in the axial direction; and a permanent magnet for generating attractive force to hold the plunger in the retracted position or protruding position to which the plunger has moved, and wherein the movable-side engaging plate is attached to the plunger; the movable-side engaging plate is in the halt cancelation position when the plunger is in the retracted position; and the movable-side engaging plate is in the halt position when the plunger is in the protruding position.

* * * * *